March 11, 1969  J. F. CIRINO ET AL  3,431,580

VEHICLE WASHING APPARATUS

Filed Oct. 26, 1964

INVENTORS.
JOHN F. CIRINO
CHARLES BRENNER

BY Seidel & Gonda

ATTORNEYS.

INVENTORS.
JOHN F. CIRINO
CHARLES BRENNER
BY Seidel & Gouda
ATTORNEYS.

INVENTORS.
JOHN F. CIRINO
CHARLES BRENNER
BY Seidel & Gonda
ATTORNEYS.

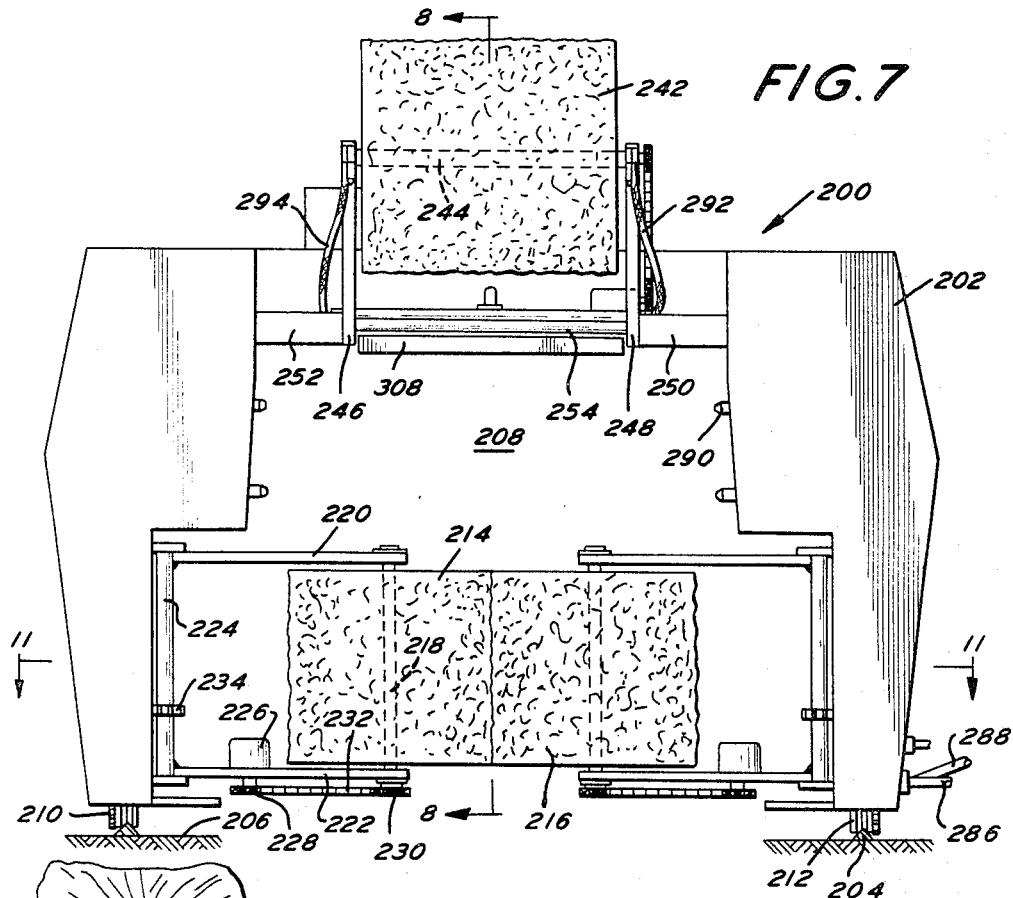
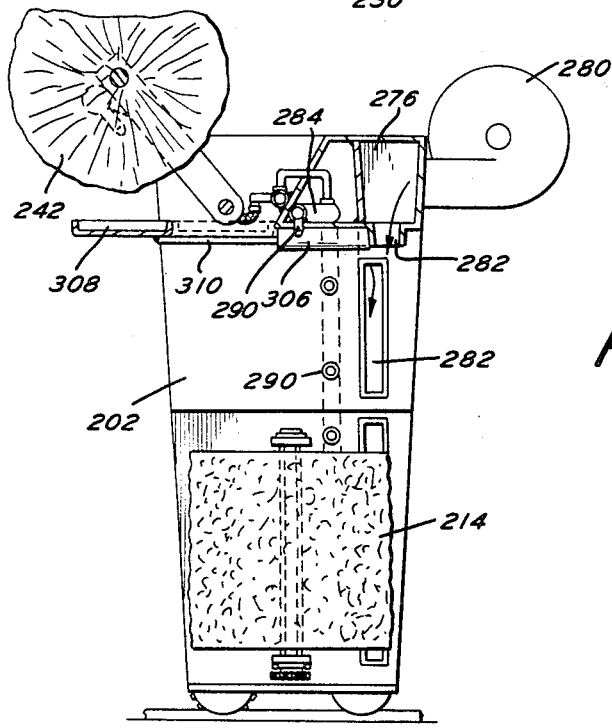

INVENTORS.
JOHN F. CIRINO
CHARLES BRENNER
BY Seidel & Gonda
ATTORNEYS.

INVENTORS.
JOHN F. CIRINO
CHARLES BRENNER

BY Seidel & Gonda

ATTORNEYS.

3,431,580
VEHICLE WASHING APPARATUS
John F. Cirino, Churchville, and Charles Brenner, Overbrook Hills, Pa., assignors to Mr. Robot, Inc., Bala-Cynwyd, Pa., a corporation of Pennsylvania
Continuation-in-part of application Ser. No. 364,987, May 5, 1964. This application Oct. 26, 1964, Ser. No. 406,516
U.S. Cl. 15—302        5 Claims
Int. Cl. B60s 3/04

ABSTRACT OF THE DISCLOSURE

An automatic car washing apparatus which reciprocates relative to a stationary vehicle along the length thereof for automatically washing and drying the vehicle. A movable manifold is provided above the vehicle and includes air blast means and wash liquid spray means. The manifold chamber is pivotally mounted and changes its elevation in accord with sensing means which contact the upper surfaces of the vehicle, thus keeping the exit of the manifold in relatively close relationship to the varying height upper surfaces of the vehicle.

---

This invention relates to apparatus for automatically washing and drying a stationary vehicle such as an automobile.

This application is a continuation-in-part of our copending application Ser. No. 364,987, filed on May 5, 1964, now abandoned, and entitled, Automatic Car Washing Apparatus.

The automatic car washing apparatus disclosed in our above-identified application is of a type which reciprocates relative to a stationary vehicle for automatically washing and drying the vehicle without manual intervention. The present invention provides a similar vehicle washing and dryng apparatus with means for enabling the wash liquid and the dryng air to be more effectively utilized. Thus, one form of the present invention provides for a movable manifold chamber adapted to be closely spaced to the hood, roof and trunk of the vehicle for directing drying air on the vehicle and movable in response to the change of the contour of the vehicle. Another form of the invention provides for a rotatable brush for scrubbing the hood, roof and trunk of the vehicle during a wash cycle.

It is an object of the present invention to disclose a vehicle washing and drying apparatus whose operation may be completely automatic.

It is another object of the present invention to provide an automatic car washing and drying apparatus wherein wash liquid and drying air discharges through a movable chamber whereby the wash liquid and drying air may be more effectively utilized.

Another object of the present invention is to provide a completely automatic car washing and drying apparatus having a movable manifold chamber.

A still further object of the present invention is to provide an automatic car washing apparatus having a rotatable brush for scrubbing the hood, roof and trunk of a vehicle during the wash cycle.

Another object of this invention is to provide an automatic car washing apparatus having a plurality of brushes for scrubbing all portions of a vehicle during a wash cycle.

It is another object of the present invention to provide an automatic vehicle washing and drying apparatus which is more efficient and more effective than those proposed heretofore.

Other objects will appear hereinafter.

For the purpose of illustrating the invention, there is shown in the drawings forms which are presently preferred; it being understood, however, that this invention is not limited to the precise arrangements and instrumentalities shown.

FIGURE 7 is a front view in elevation of another form of car washing apparatus of the present invention in one position of operation.

FIGURE 8 is a sectional view taken substantially along the line 8—8 in FIGURE 7.

Figure 1:
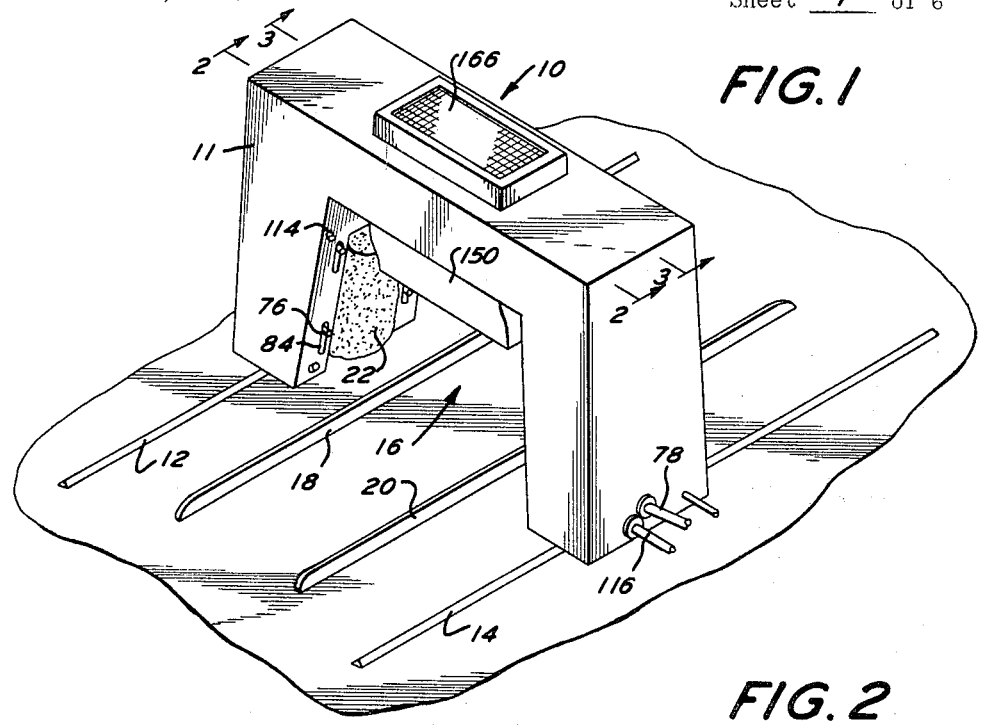
FIGURE 1 is a perspective view of one form of car washing apparatus of the present invention.
Figure 2:
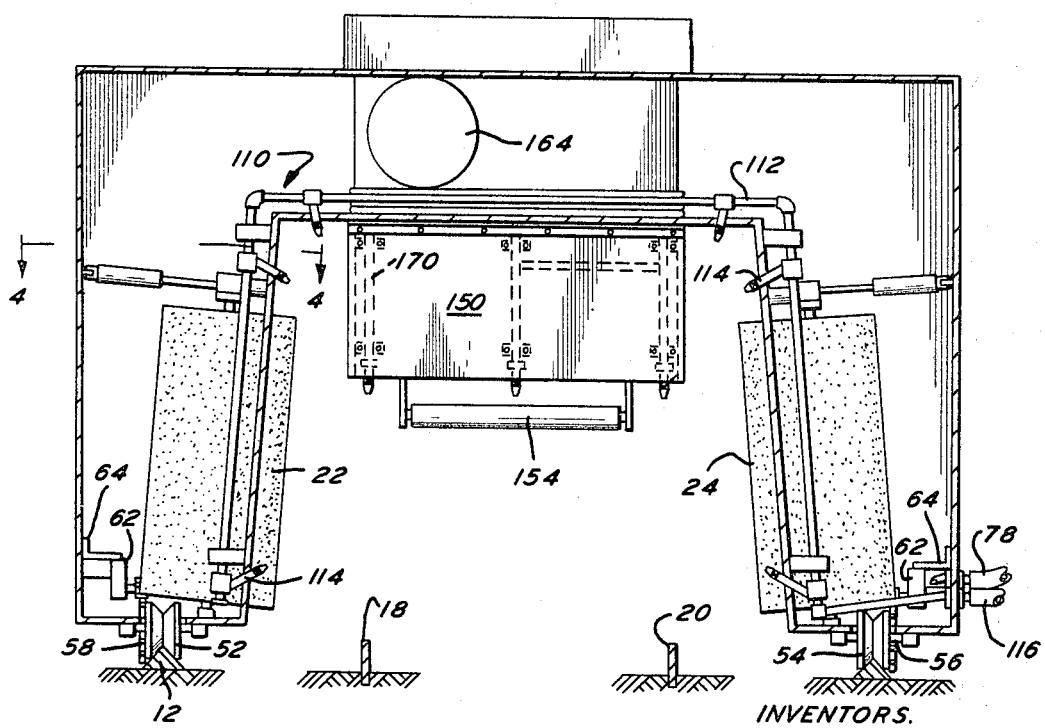
FIGURE 2 is a sectional view taken substantially along the line 2—2 in FIGURE 1.
Figure 3:
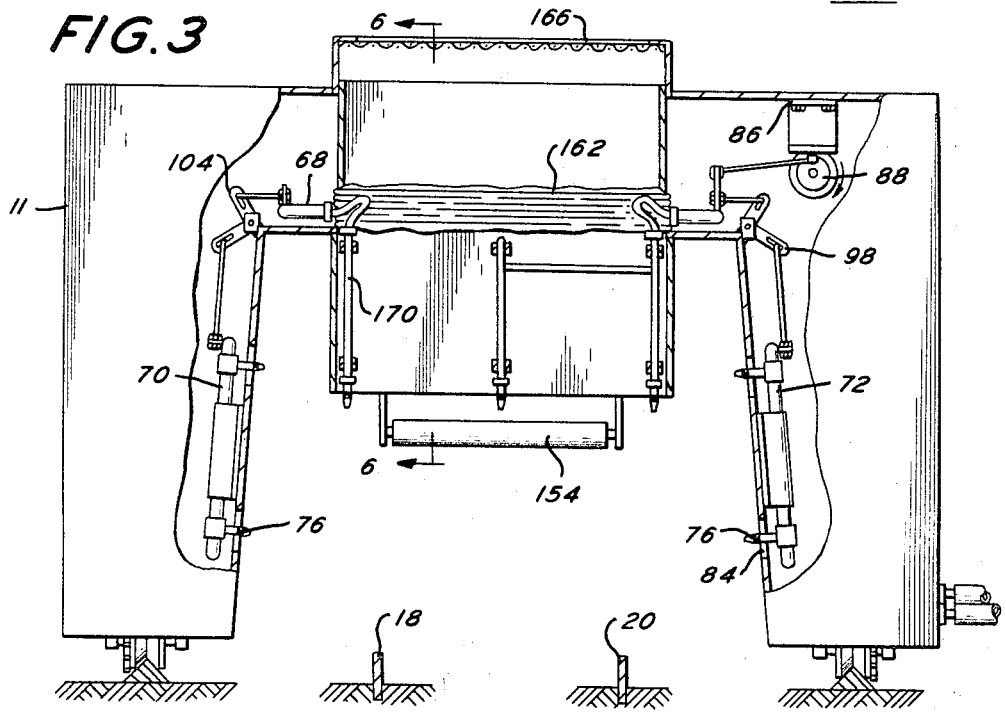
FIGURE 3 is a sectional view taken substantially along the line 3—3 in FIGURE 1.

Referring to the drawings in detail, wherein like numerals indicate like elements, there is illustrated in FIGURES 1-6 a vehicle washing apparatus designated generally by the numeral 10.

The apparatus 10 includes a generally U-shaped hollow frame or housing 11. The housing 11 is adapted to reciprocate along a pair of spaced tracks 12 and 14. The central open area beneath the housing 11 forms a carport 16. A pair of parallel, spaced car wheel guides 18 and 20 are positioned within the carport 16. A vehicle such as an automobile, to be processed, is driven into the carport 16 with the car wheel guides 18 and 20 in abutment with the inner circumference of tires of the automobile. The automobile remains stationary and the housing 11 is adapted to reciprocate relative to it.

Pairs of wheels 52 and 54 are supported from the depending legs of the U-shaped hollow housing 11. The wheels 52 and 54 are in rolling engagement with the tracks 12 and 14, respectively. A rear wheel of each pair is mounted upon a shaft 56 rotatably supported by the housing. Mounted within each of the legs of the housing 11 is an L-shaped bracket 64 supporting a reversible electric motor 62. A pinion is secured to the motor shaft and meshes with a gear 58 adapted to rotate the shaft 56 on which it is supported. Thus, the motor 62 will rotate the rear wheels of each pair and move the frame along the tracks 12 and 14. At the end of the tracks 12 and 14, electric circuitry (not shown) of conventional construction will reverse the direction of rotation of the motor 62 to cause the housing 11 to move in an opposite direction.

Extending from the opposed legs of the frame 11 into the carport 16, are a pair of cylindrical brushes 22 and 24. Each brush is mounted upon a shaft 26 extending through its axis. An electric motor 28 is coupled to the brush shaft 26. Upon actuation of the motor 28, the shaft 26 and the brushes will rotate.

Figure 4:
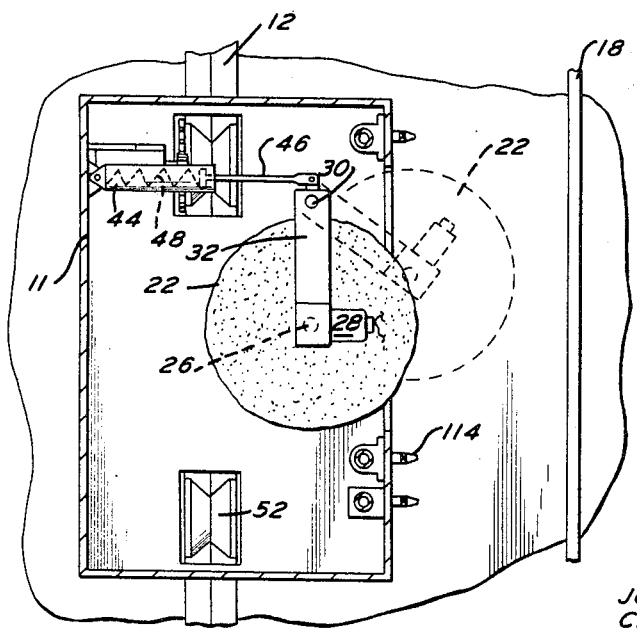
FIGURE 4 is a sectional view taken substantially along the line 4—4 in FIGURE 2.
Figure 5:
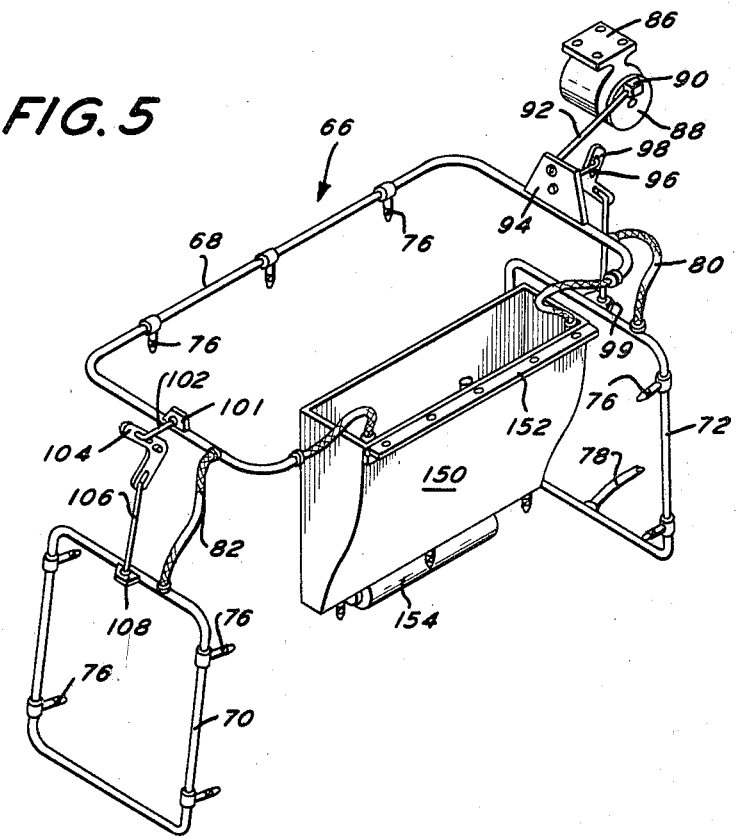
FIGURE 5 is a diagrammatic perspective view of the hot water spray system and manifold chamber used in conjunction with the apparatus of FIGURE 1.

Each of the brush shafts 26 are journalled in the ends of a pair of parallel arms, the upper one of which is illustrated in FIGURE 4 and designated by the numeral 32. The arms are pivotably mounted on a pivot shaft 30. The shaft 30 is secured within suitable bearings. The lowermost bearing for shaft 30 is secured directly to the bottom of a leg of the frame 11, while the uppermost bearing may be in the nature of a bracket or support arm welded or otherwise secured to the interior of a leg of the frame.

The arm 32 has one end coupled to a piston rod 46 of a hydraulic cylinder 44. A coil spring 48 is disposed within the cylinder 44 and biases the piston rod 46 to the solid line position illustrated in FIGURE 4.

Hydraulic fluid is adapted to be admitted into the cylinder 44. Upon admission of hydraulic fluid, the piston rod 46 will move to the left as viewed in FIGURE 4 causing the brush 22 to swing into the carport 16, as illustrated in phantom in FIGURE 4, for engagement with the side of the stationary vehicle. Similarly, the brush 24 simultaneously swings into the carport 16 for engagement with the opposite side of the stationary vehicle. When the brushes are no longer needed, the hydraulic fluid within the cylinder 44 will be permitted to be discharged through a suitable conventional valve, thereby enabling the spring 48 to expand and cause the brush 22 to move to the solid line position in FIGURE 4.

The washing cycle is initiated simultaneously with the engagement of the brushes 22 and 24 with the sides of the stationary vehicle. The washing cycle is carried out through a hot water spray system designated generally by the numeral 66 in FIGURE 5. The hot water spray system 66 includes a generally C-shaped conduit 68 mounted for reciprocation in brackets secured within the top of the hollow housing 11. A pair of conduits in the form of closed loops are provided. Each of the closed loop conduits 70 and 72 are reciprocably mounted in one of the legs of the housing 11.

A hot water inlet pipe 78 is connected to the closed loop conduit 72. The closed loop conduit 72 communicates with the conduit 68 by means of a flexible hose 80. Similarly, the closed loop conduit 70 communicates with the conduit 68 by means of a flexible hose 82.

Mounted at spaced points along the conduits 68, 70 and 72, there are provided spray nozzles 76. The nozzles 76 extend through elongated slots 84 in the side walls of the housing 11. A suitable detergent such as No. 28 Proctor and Gamble is mixed with hot water and emitted through the hot water inlet conduit 78 to each of the nozzles 76 to spray the stationary vehicle. Mixed water and detergent emanate from the nozzles 76 at a pressure of approximately 300 p.s.i. to break-up dirt particles on the body of the vehicle.

To insure a pressurized spray on all portions of the body of the vehicle, nozzles 76 are adapted to be reciprocated as the housing 11 reciprocates along the tracks 12 and 14. Hence, a motor bracket 86 is mounted within the housing 11 and supports an electric motor having a fly wheel 88. Fly wheel 88 has an eccentric 90 coupled to a connecting rod 92. Connecting rod 92 is coupled to a vertical bracket 94 on one side of the conduit 68. A connecting rod 96 connects the bracket 94 to one side of the pivotably mounted bell crank 98. The opposite side of the bell crank 98 is pivotably connected to a connecting rod 100. Rod 100 is connected to a bracket 99 on the conduit 72.

The conduit 68 has a second bracket 101 coupled to a connecting rod 102. Connecting rod 102 is coupled to a pivotable bell crank 104. The opposite side of the bell crank 104 from the connecting rod 102 is coupled to one end of a connecting rod 106. The other end of the connecting rod 106 is coupled to a bracket 108 on the conduit 70.

Upon rotation of the fly wheel 88 and the eccentric 90, the connecting rod 92 will reciprocate the conduit 68 along the top of the housing 11. The horizontal reciprocatory motion of the conduit 68 will be transmitted through the bell crank 98 to the conduit 72 and through the bell crank 104 to the conduit 70. Hence, the conduits 70 and 72 will reciprocate in an essentially upright direction. The conduits 70 and 72 will reciprocate in substantially opposite directions. In this manner, a spray of approximately 300 p.s.i. may be directed to all portions of the body of the vehicle as the housing 11 reciprocates along the tracks 12 and 14.

In order to make the most effective use of the spray of wash liquid at a pressure of approximately 300 p.s.i., a movable manifold chamber 150 is provided. The manifold chamber 150 is pivotably supported by the housing 11 by means of a hinge 152. A roller 154 is rotatably supported at the lower end of the chamber 150. The brackets supporting the roller 154 are coupled to a control valve 156.

Valve 156 controls the admission of hydraulic fluid to a cylinder 158 supported by a pivotable connection to a bracket 160 on the housing 11. A piston rod has one end disposed within the cylinder 158 and its opposite end pivotably coupled to the manifold chamber 150.

The interior of the manifold chamber is coupled by a flexible conduit 162 to the outlet side of a blower 164. The blower 164 is disposed within the housing 11. An inlet for air to the blower is provided with a screen 166.

The manifold chamber 150 is biased by means of a spring 168 to a substantially horizontal position. The bias of spring 168 is opposed by the admission of hydraulic fluid into the cylinder 158 which maintains the manifold chamber 150 in the position illustrated in FIGURE 6. Conduits 170 are disposed within the manifold chamber 150 and terminate at the lower end in discharge nozzles similar to nozzles 76. The upper end of the conduits 170 are coupled by flexible hoses to conduit 68.

The roller 154 is adapted to be in rolling engagement with the upper surface of the body of the vehicle. Hence, the roller 154 is preferably made from a resilient material such as rubber or the like. When the roller 154 is rolling along the upper surface of the hood and reaches the windshields, it will rotate about its pivotable support thereby varying the position of the actuator and valve 156. By varying the control valve 156, the piston rod in cylinder 158 will move to the left under the effect of the spring 168 thereby enabling the chamber 150 to pivot about the longitudinal axis of the pin on the hinge 152.

Figure 6:
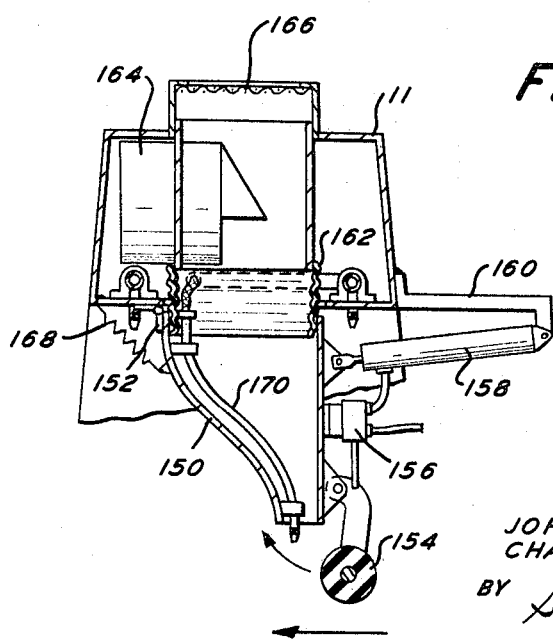
FIGURE 6 is a sectional view taken substantially along the line 6—6 in FIGURE 3.

When the roller 154 has climbed the windshield and is rolling along the hood, the valve 156 will be repositioned to control the hydraulic fluid in cylinder 158 whereby the piston rod in cylinder 158 will cause the manifold chamber 150 to assume the position illustrated in FIGURE 6. The position of the manifold chamber 150 will be substantially as illustrated in FIGURE 6 except when the windshield is being cleaned. In this manner, the discharge nozzles for the conduit 170 are adapted to be spaced from the surface of the body of the vehicle by a distance of approximately 6 to 8 inches. In this manner, assurance is provided that the full effect of the pressurized wash liquid is being utilized. At the end of the cycle, an external control is provided to deactivate valve 156 whereby spring 168 will pivot the chamber 150 to a substantially horizontal position.

After the washing cycle is completed, water and detergent will cease flowing through the inlet conduit 78 and the brushes 22 and 24 will be moved out of engagement with the side of the body of the vehicle. Thereafter, a rinse cycle may be initiated. The rinse cycle is effected by a cold water spray system 110 (see FIGURE 2). System 110 includes a U-shaped conduit 112 mounted within the top and the legs of the housing 11 and stationary with respect thereto. Spray nozzles 114 are coupled to the conduit 112 at spaced points therealong. The nozzles 114 extend through the side walls of the housing 11 and are directed toward the carport 16.

A cold water inlet conduit 116 is coupled to the conduit 112. When rinse water is flowing through the conduits 116 and 112, the nozzles 114 will direct a spray of approximately 40 p.s.i. onto the body of the vehicle.

This rinse will wash away the previously applied detergent and loosened dirt particles. If desired, a wax may be introduced into the rinse water on a subsequent pass of the housing 11. After the rinsing cycle is completed, the body of the vehicle is adapted to be dried. This is effected by the drying system.

The drying system includes the blower 164 which discharges air directly through the manifold chamber 150 onto the upper surface of the body of the vehicle. The length of the manifold chamber 150 is slightly more than the width of the vehicle to be dried. Hence, air will also be directed downwardly along the sides of the body of the vehicle to be dried.

It is believed that the operation of the apparatus, especially in view of the above-mentioned copending application, is apparent from the description heretofore. Thus, coins are adapted to be placed in a meter mounted on one of the sides of the housing 11 or any other convenient supporting surface. The introduction of coins into the meter will activate suitable electrical circuitry (not shown) for effecting operation of the various components of the apparatus 10 in a predetermined timed cycle.

The activation of the apparatus initially results in hydraulic fluid being admitted into the cylinders 44. The retraction of the piston rods 46 will oscillate the brushes 22 and 24 into engagement with each side of the automobile or other vehicle to be processed. As the brushes 22 and 24 are engaged to the sides of the vehicle, the electric motors 28 are initiated to rotate the brushes 22 and 24.

As soon as the brushes 22 and 24 engage the sides of the vehicle to be processed, a washing cycle is commenced to run for approximately one and one half minutes. The washing cycle comprises two reciprocations of the housing 11 back and forth along the tracks 12 and 14. Water and detergent are admitted through conduit 78 to each of the conduits 68, 70, 72 and 170. The water and detergent are discharged from the nozzles at a pressure approximately 300 p.s.i. to break-up dirt particles on the body of the vehicle to be processed.

At the same time, fly wheel 88 and eccentric 90 are rotated to reciprocate the conduits 68, 70 and 72 during reciprocable movement of the housing 11. This insures that every portion of the body is washed and all dirt particles are broken up without a set wash pattern. The manifold chamber 150 is rotated depending upon the portion of the body of the vehicle below the housing 11. The nozzles for conduits 170 provide a wash fluid stream at the same pressure of approximately 300 p.s.i., but the stream is only 6 to 8 inches away from the surface to be cleaned thereby insuring that all dirt particles be broken up.

At a predetermined time, the washing cycle is ended and the brushes are retracted into the legs of the housing 11. The rinsing cycle then commences. The rinsing cycle includes the introduction of cold water through conduit 16 to conduit 112. The cold water is discharged from nozzles 114 against the body of the vehicle to be processed at a pressure approximately 40 p.s.i. to rinse away excess detergent and loosened dirt from the body of the vehicle. Generally four reciprocations of the housing 11 are effected during the rinse cycle.

During the third reciprocation of the housing 11, a liquid wax may be introduced into the rinse water. At a predetermined time, the rinse water is shut off. Thereafter, the body of the vehicle may be dried by blower 164 directing air through the manifold chamber 150 at the top and down the sides of the body of the vehicle to be processed. The discharge of air from the blower 164 may be 20,000 to 25,000 cubic feet per minute. The drying operation may take place during two reciprocations of the housing 11.

Thus, the apparatus may perform a washing, rinsing and drying operation on a vehicle body in a completely automatic cycle.

Referring now to the embodiment of the invention illustrated in FIGURES 7–13, a vehicle washing apparatus is generally designated by the numeral 200.

The apparatus 200 includes a generally U-shaped hollow frame or housing 202. The housing 202 is adapted to reciprocate along a pair of spaced tracks 204 and 206. The central open area beneath the housing 202 forms a carport 208. A vehicle, such as an automobile, is driven into the carport. The automobile remains stationary and the housing 202 is adapted to reciprocate relative to it.

Pairs of wheels 210 and 212 are supported from the depending legs of the U-shaped hollow housing 202. The wheels 210 and 212 are in rolling engagement with the tracks 206 and 204 respectively. The manner of rotating each wheel is identical to the embodiment of the invention illustrated in FIGURES 1–6, and reference thereto should be had for a full understanding of the present embodiment.

Extending from the opposed legs of the housing 202 into the carport 208, are a pair of cylindrical brushes 214 and 216. Each brush is mounted upon a shaft 218 extending through its axis. Each brush shaft is supported in cantilever fashion at the ends of a pair of parallel arms 220 and 222. The arms 220 and 222 are connected at their ends opposite from the brush shaft 218 to a swivel post 224. The swivel post 224 has a gear 234 fixed intermediate its ends. The gear 234 is in mesh with a pinion 236 mounted upon a shaft 238 of an electric motor 240 supported within the legs of the housing 202. Accordingly, upon actuation of the motor 240, the brush 214 can swing in an arcuate path more fully illustrated in FIGURE 11. The brush 216 operates in a similar manner.

Supported upon the arm 222 is an electric motor 226. A sprocket 228 is connected to the motor shaft 226 and a sprocket 230 is connected to one end of brush shaft 218. An endless chain 232 is entrained about the sprockets 228 and 230 to effect a driving connection between the motor 226 and the brush shaft 218. Thus, upon actuation of motor 226 the brush 214 can be made to rotate about its own axis. The brush 216 is operated in an identical manner.

The brushes 214 and 216 are adapted to scrub the sides of an automobile within the carport 208. A third brush 242 is also provided for scrubbing the roof, trunk, and hood of the automobile within the carport 208 simultaneously with the scrubbing effected by the brushes 214 and 216.

The brush 242 is rotatable about its longitudinal axis. A brush shaft 244 extends through the longitudinal axis of the brush 242 and is connected at opposite ends to spaced, parallel hanger arms 246 and 248. The hanger arms 246 and 248 are connected to hanger arm brackets 252 and 250 respectively. The brackets 250 and 252 are integrally connected to a shaft 254 which extends through them. The shaft 254 is journalled within a bearing 256 in the housing 202. Intermediate its ends, the shaft 254 is provided with a gear 266. A bracket 258 is provided within one leg of the housing 202. Mounted upon the bracket is an electric motor 260 having a shaft 262. A pinion 264 is keyed to the shaft 262 and in mesh with the gear 266.

Figure 9:
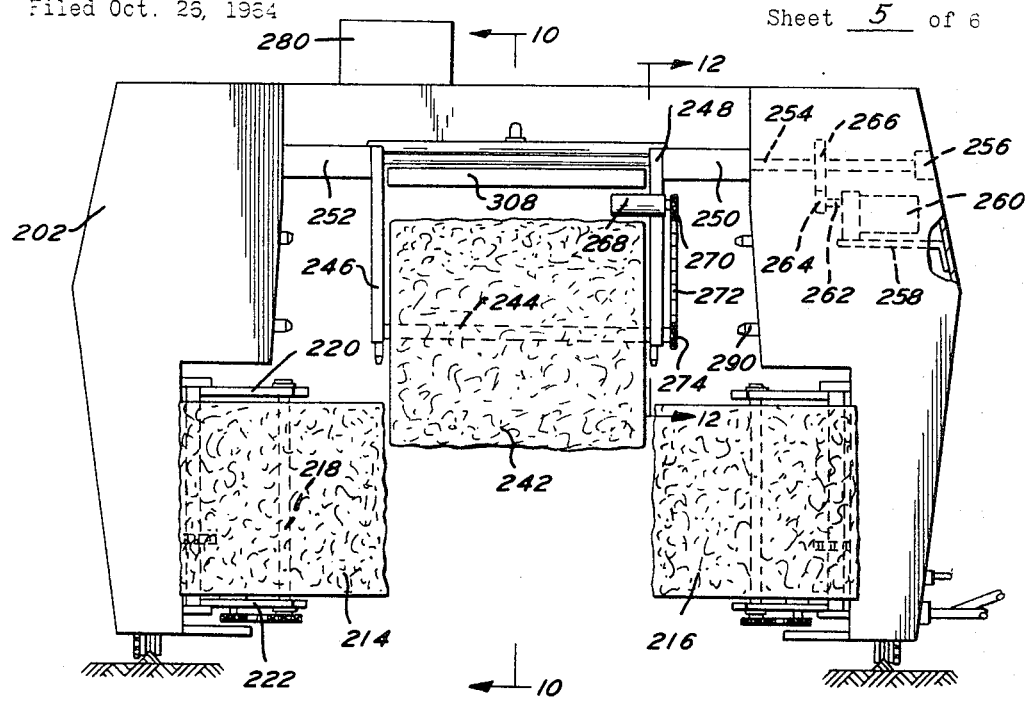
FIGURE 9 is a front view in elevation similar to FIGURE 7, but illustrating a second position of operation of the apparatus.

Actuation of the motor 260 will cause the shaft 254 to rotate thereby rotating the hanger arms 246 and 248. Rotation of the hanger arms 246 and 248 will cause the brush to assume a position as shown in FIGURE 7 or FIGURE 9.

Mounted upon a hanger arm 248 is an electric motor 268. Connected to the motor shaft is a sprocket 270. Connected to one end of the brush shaft 244 is a sprocket 274. Entrained about the sprockets 270 and 274 is an endless chain 272. Actuation of the motor 268 will cause rotation of the brush 242 about its own axis.

The front of the housing 202 is recessed. The portion is the housing which connectes its legs is divided into a rear housing compartment 276 and a front housing compartment 278. Projecting from the rear of the housing 202 is a blower 280. The blower 280 is in communication with the housing 276. The housing 276 is also in communication with each of the hollow legs of the housing 202. Air directing ducts 282 are formed in the bottom of the housing 276 and at spaced areas in the legs of the housing 202. Hence, when the blower 280 is actuated, air is adapted to be directed from the compartment 276 through the ducts 282 about the automobile. The air will cause the automobile to be dried.

Mounted within the compartment 278 is a water conduit 284. The conduit 284 also has portions mounted in each leg of the housing 202. At spaced points along the conduit, spray nozzles 290 are provided for directing both hot wash water and cold rinse water on the automobile as the housing 202 reciprocates during the washing cycle. A conduit 286 is connected to conduit 284 for supplying hot water. A conduit 288 is also connected to the conduit 284 for supplying rinse water.

The width of the top brush is such so as not to interfere with any projections, such as a radio aerial, on the hood of the automobile. Therefore, there will be a small portion of the hood, roof, and trunk of the automobile which is not scrubbed by any brush. In order to insure that all dirt particles on these small areas are broken up, a pair of flexible water conduits 294 and 296 are provided. The conduit 294 is connected for movement with the hanger arm 246. The conduit 292 is connected for movement with the hanger arm 248.

Each of the conduits 292 and 294 terminate in a water spray nozzle 296. The opposite ends of each of the conduits 292 and 294 are connected to the conduit 284 which supplies the water. When the brush is in its down operative position, the nozzles 296 on each of the conduits 292 and 294 are spaced 6 to 8 inches from the body of the automobile. Accordingly, a high velocity stream of water is directed along the side portions of the automobile to break up any dirt particles clinging thereto. This constitutes an effective substitute for the scrubbing action of the brush 242.

Brush 242 is adapted to pivot about the axis of the shaft 254 as the housing reciprocates relative to the stationary automobile. That is, the brush 242 will follow the contour of the automobile and while intermediate the roof and hood of the automobile as well as the trunk and roof, the brush will pivot in order to compensate for its changes in elevation. Accordingly, the nozzles 296 must be maintained in a vertical disposition at all times in order that they be effective and spray water upon the automobile.

Figure 13:
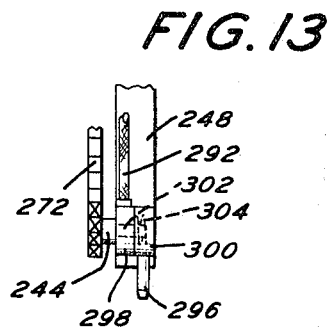
FIGURE 13 is an elevational view taken substantially along the line 13—13 in FIGURE 12.

With reference to FIGURE 13, it will become apparent that the nozzle 296 is connected to a housing 300. The housing 300 is adapted to rotate relative to a housing 298 connected to each of the flexible conduits 292 or 294. A pin 302 is fixed to the housing 298. The housing 300 is adapted to telescope over the pin 302. A torsion spring 304 is wound about the pin 302. The spring 304 biases the nozzle 296 to assume a vertical disposition at all times. Thus, the housings 300 and 298 may pivot relative to each other while the spring 304 biases the housing 300 and nozzle 296 to a vertical disposition at all times.

Figure 10:
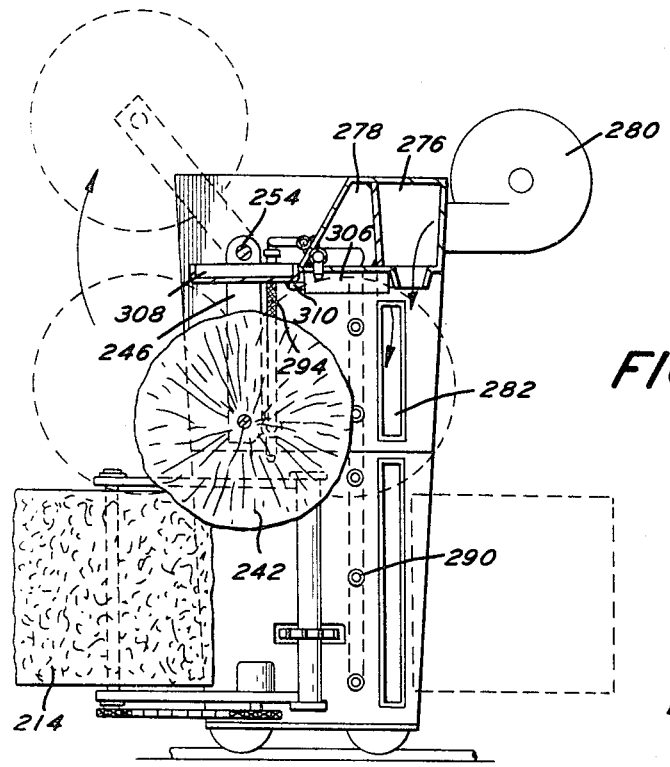
FIGURE 10 is a sectional view taken substantially along the line 10—10 in FIGURE 9.

A drip pan 308 is adapted to be extended from the housing 202 when the brush 242 is in its inoperative position to catch any water drippings from the brush. The pan 308 is connected to a piston rod 310 extending into a power cylinder 306 rigidly mounted on the housing 202 beneath the compartments 276 and 278. When the brush is down in its operative position, the pan 308 is retracted by the power cylinder 306 as shown in FIGURE 10. When the brush is in its inoperative up position, the power cylinder 306 extends the pan 308 to a position underlying the brush 242. This is shown in FIGURE 8.

The operation of the vehicle washing apparatus 200 is substantially as follows:

The brushes 214, 216 and 242 are initially disposed in the position shown in FIGURE 7. The car is disposed within the carport 208 with its front bumper in abutment with the brushes 214 and 216.

With the automobile in abutment with the brushes 214 and 216, the washing cycle is initiated. The motors 226 are actuated to cause rotation of the brushes 214 and 216 for scrubbing the front of the automobile. Hot water mixed with a suitable detergent is discharged through the nozzles 290 against the sides of the automobile and across the front.

After a predetermined time interval, the housing 202 is caused to reciprocate along the tracks 204 and 206. Movement of the housing 202 relative to the automobile will cause the brushes 214 and 216 to be pushed by the front of the automobile and oscillated to the position indicated by A in FIGURE 11. That is, the brushes 214 and 216 are swung about the axis of swivel post 224 to a position trailing the housing. When the brushes 214 and 216 are swung to the position indicated at A in FIGURE 11, the motor 260 is actuated to cause the top brush 242 to swing about the axis of the shaft 254 to its operative position illustrated in FIGURE 10. The brush 242 will come down on the front of the hood of the automobile being processed. Since the brushes 214 and 216 have been swung to a position trailing the housing 202, and initially in advance of the sides of the automobile, there is no interference between the brushes 214, 216 and 242. When the brush 242 engages the automobile hood, the motor 268 is actuated to cause rotation of the brush 242 about its longitudinal axis. Meanwhile, hot water and detergent are also emanating from the nozzles 296 along the sides of the automobile as the housing traverses the automobile. The nozzles 296 are spaced 6–8 inches from the hood, thereby causing dirt particles not scrubbed by the brush 242 to break up.

Subsequent movement of the housing 202 will cause the brushes 216 and 218 to scrub the sides of the automobile in trailing relation to the top brush 242. The top brush 242 is adapted to swing around the axis of shaft 254 during changes in its elevation, as for example, when moving from the hood to the roof of the automobile and from the roof to the trunk. Nozzles 296 are provided across the length of compartment 278 so that washing of the roof, trunk, and hood may be effected.

Figure 11:
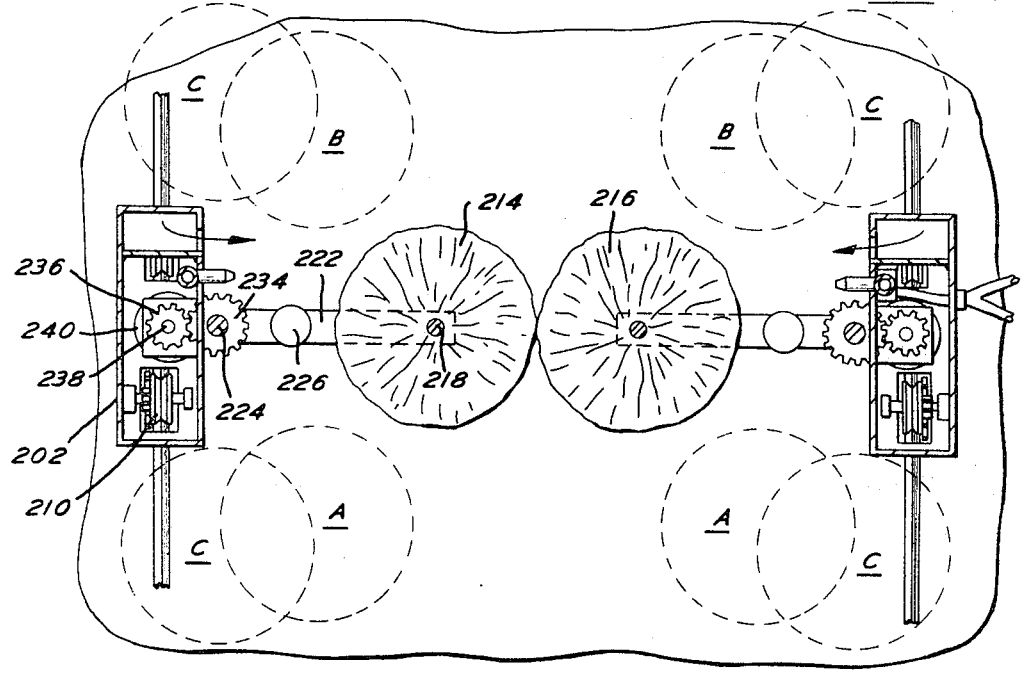
FIGURE 11 is a sectional view taken substantially along the line 11—11 in FIGURE 7.
Figure 12:
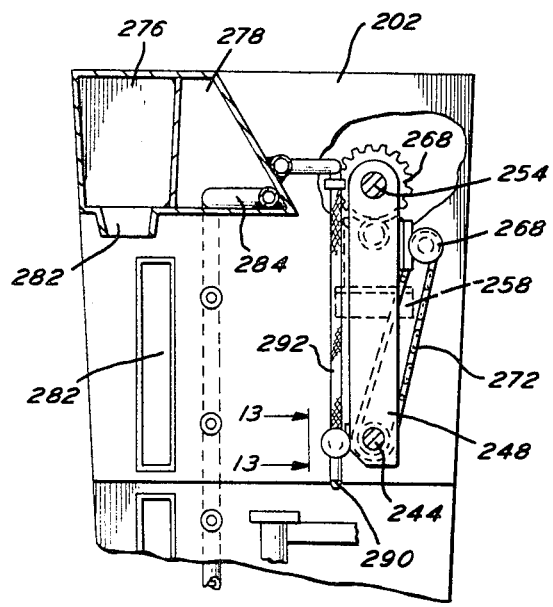
FIGURE 12 is a sectional view taken substantially along the line 12—12 in FIGURE 9.

When the brush 242 traverses the trunk, the operation of the motor 260 is reversed so as to raise the brush to the position shown in FIGURE 7. The trailing brushes 214 and 216 then finish scrubbing the sides of the automobile and when they pass the last side portion, they swing into abutting relationship as shown in FIGURE 11. The housing is then moved in an opposite direction and the brushes 214 and 216 abut the rear end of the vehicle.

The washing cycle continues and the brushes 214 and 216 scrub the rear of the vehicle.

As the housing continues to reciprocate in an opposite direction to the stationary vehicle, the brushes 214 and 216 are caused to oscillate by contact with the rear of the vehicle to the position shown by B in FIGURE 11. The brushes 214 and 216 once again lag behind the housing 202. As the brushes 214 and 216 assume the position B, the motor 260 is then actuated to lower the top brush 242 down onto the trunk of the vehicle. Since the brushes 214 and 216 lag the housing, there is no interference between the brushes when the brush 242 is lowered. The washing cycle then continues as described before.

The washing cycle can run for two or more passes of the housing with respect to the automobile. At a predetermined time, the washing cycle is ended and the side brushes 214 and 216 are retracted by means of the motors 240 to either position C shown in FIGURE 11. At the end of the washing cycle, the brush 242 will be in its up inoperative position as described heretofore.

After the washing cycle is ended, the power cylinder 306 is activated to thrust the piston rod 310 and drip pan 308 forward as shown in FIGURE 8. Water accumulated by the brush 242 is caught in the drip pan 308. The motor 258 acts as a brake to maintain the brush 242 in the position shown in FIGURE 8.

After the washing cycle is completed, a rinsing cycle commences. The rinsing cycle includes the introduction of cold water through the conduit 288 into the conduit 284 to be dispensed by the spray nozzles 290. The cold water is discharged from the nozzle 290 against the body of the vehicle to rinse away excess detergent and loosened dirt from the body of the vehicle. Generally four reciprocations of the housing 202 are effected during the rinse cycle.

During the rinse cycle, a liquid wax may be introduced into the rinse water.

At a predetermined time, the rinse water is shut off. Thereafter, the body of the vehicle may be dried by actuating blower 280 and directing air through the ducts 282 at the top and the sides of the body of the automobile processed. The drying operation may take place during two reciprocations of the housing 202.

To start operation of the apparatus 200, coins are adapted to be placed in a meter mounted on one of the sides of the housing 202 or any other convenient supporting surface. The introduction of coins into the meter will activate some suitable electrical circuitry (not shown) for effecting operation of the various components of the apparatus in a predetermined timed cycle as disclosed heretofore.

Thus, the apparatus 200 performs a washing, rinsing, and drying operation on a vehicle body in a completely automatic cycle. Substantially every portion of the vehicle body is scrubbed by a rotating brush to insure breaking up and loosening of dirt particles on the vehicle body.

We claim:

1. Apparatus for automatically washing a vehicle comprising a reciprocatory housing, a water spray system, and a forced air drying system, said water spray system and said forced air drying system being supported by said housing and operable in a predetermined timed cycle, said forced air drying system including a manifold chamber having an open end projecting downwardly from said housing for directing air onto a vehicle being processed, said water spray system including a plurality of spray nozzles extending from said housing and supported within said manifold chamber adjacent its open end, and mechanical means connected to said manifold chamber for oscillating it and said spray nozzles about a horizontal axis in response to changes in elevation of a vehicle undergoing processing by said apparatus.

2. Apparatus in accordance with claim 1 wherein said mechanical means includes means pivotably connecting said manifold chamber to said housing, spring means between one side of said manifold chamber and said housing for urging said chamber to pivot toward said housing in one direction, a roller pivotably mounted on said manifold chamber for contact with a vehicle undergoing processing by said apparatus, and fluid motor means between the other side of said manifold chamber and said housing for applying a force to said manifold chamber opposing the bias of said spring means, said fluid motor means including valve means operatively connected to said roller and responsive to changes in its elevation for varying the amount of fluid admitted to said fluid motor means.

3. Apparatus for automatically washing a vehicle comprising a hollow, generally U-shaped housing having a central opening adapted to surround a vehicle to be processed, said housing including a pair of legs joined by a closing top portion, means mounting said housing legs for rolling engagement with a support, means for reciprocating said mounting means along said support, a water spray system, a forced air drying system, said water spray system and said forced air drying system being supported by said housing and operable in a predetermined timed cycle, said forced air drying system including a manifold chamber having an open end projecting downwardly from the top portion of said housing for directing air onto a vehicle being processed, said water spray system including a plurality of spray nozzles projecting outwardly from said housing legs and projecting downwardly from the top portion of said housing, said spray nozzles projecting downwardly from the top portion of said housing being supported within said manifold chamber adjacent its open end, mechanical means connected to said manifold chamber for oscillating it and the spray nozzles it supports about a horizontal axis in response to changes in elevation of a vehicle undergoing processing by said apparatus, a rotatable brush extending from each leg portion of said housing for wiping engagement with a vehicle in conjunction with the operation of said water spray system, and mechanical means within said housing for oscillating said brushes in an arcuate path about a vertical axis with respect to said housing legs.

4. Apparatus for automatically washing a vehicle comprising a hollow, generally U-shaped housing having a central opening adapted to surround a vehicle to be processed, said housing including a pair of legs joined by a closing top portion, means mounting said housing legs for rolling engagement with a support, means for reciprocating said mounting means along said support, a water spray system supported by said housing, said water spray system including a plurality of spray nozzles extending from said housing, discrete water inlet conduits connected to selected ones of said spray nozzles, said conduits being mounted in each leg and top of said housing, a portion of said conduit mounted in the top of said housing projecting downwardly into said central opening, mechanical drive means connecting said conduits to each other for relative reciprocable movement with respect to each other and said housing, said drive means reciprocating the conduit mounted in the top portion of said housing in a horizontal plane and the conduits mounted in the legs of said housing in opposite directions to each other in an upright plane, and separate mechanical means connected to the conduit portion projecting downwardly from the top of said housing for oscillating it about a horizontal axis in response to changes in elevation of a vehicle undergoing processing by said apparatus.

5. Apparatus for automatically washing a vehicle comprising a hollow, generally U-shaped housing having a central opening adapted to surround a vehicle to be processed, said housing including a pair of legs joined by a closing top portion, a pair of spaced, parallel tracks, means mounting said housing legs in rolling engagement with said tracks, drive means for reciprocating said mounting means along said tracks, a hot water spray system supported by said housing, said hot water spray system including a plurality of spray nozzles, discrete water inlet conduits connected to selected ones of said spray nozzles, said conduits being mounted in each leg and top of said housing, a portion of said conduit mounted in the top portion of said housing projecting downwardly from said housing into said central opening, mechanical drive means connecting said conduits to each other for relative reciprocable movement with respect to each other and said housing, said drive means reciprocating the conduits mounted in the top portion of said housing in a horizontal plane and the conduits mounted in the legs of said housing in an opposite direction to each other in an upright plane, a rotatable brush extending from each leg portion of said housing for wiping engagement with a car in conjunction with the operation of said hot water system, means within said housing for oscillating said brushes in an arcuate path about a vertical axis with respect to said housing legs, a cold water spray system, a forced-air drying system, said latter two systems being supported by said housing and operable in a predetermined timed cycle in conjunction with said hot water spray system, said forced air drying system including a manifold chamber having an open end projecting downwardly from the top portion of said housing into said central opening, the portion of said hot water conduit projecting downwardly from the top portion of said housing being supported within said manifold chamber adjacent its open end, blower means in the top portion of said housing, means communicating said blower means with said manifold chamber, and mechanical means connected to said manifold chamber for oscillating it and the portion of the hot water conduit supported by it about a horizontal axis in response to changes in elevation of a vehicle undergoing processing by said apparatus.

References Cited

UNITED STATES PATENTS

| | | |
|---|---|---|
| 2,740,414 | 4/1956 | Moskow. |
| 2,788,009 | 4/1957 | Lones. |
| 2,987,067 | 6/1961 | Vani et al. _____ 134—123 XR |
| 3,187,359 | 6/1965 | Takeuchi. |
| 3,196,888 | 7/1965 | Rousseau _____ 134—180 XR |
| 3,224,108 | 12/1965 | Flaming _____ 34—243 XR |

ROBERT W. MICHELL, *Primary Examiner.*

U.S. Cl. X.R.

134—123